United States Patent
Louis et al.

(10) Patent No.: US 6,523,018 B1
(45) Date of Patent: Feb. 18, 2003

(54) NEURAL CHIP ARCHITECTURE AND NEURAL NETWORKS INCORPORATED THEREIN

(75) Inventors: Didier Louis, Fontainebleau (FR); Pascal Tannhof, Cely en Biere (FR); André Steimle, Evry (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/470,459

(22) Filed: Dec. 22, 1999

(30) Foreign Application Priority Data

Dec. 29, 1998 (EP) .............................. 98480103

(51) Int. Cl.⁷ ................................................. G06N 3/06
(52) U.S. Cl. .............................. 706/27; 706/15; 706/26; 706/34; 711/5
(58) Field of Search .............................. 706/27, 15, 26, 706/34, 41, 42; 711/5; 382/155

(56) References Cited

U.S. PATENT DOCUMENTS

| | | | |
|---|---|---|---|
| 5,063,521 A | * 11/1991 | Peterson et al. ............... | 706/34 |
| 5,091,864 A | * 2/1992 | Baji et al. ....................... | 706/42 |
| 5,165,009 A | * 11/1992 | Watanabe et al. .............. | 706/41 |
| 5,517,600 A | * 5/1996 | Shimokawa .................... | 706/15 |
| 5,621,863 A | * 4/1997 | Boulet et al. ................... | 706/26 |
| 5,710,869 A | * 1/1998 | Godefroy et al. .............. | 706/41 |
| 5,751,987 A | * 5/1998 | Mahant-Shetti et al. ........ | 711/5 |
| 5,870,729 A | * 2/1999 | Yoda ............................... | 706/26 |
| 5,940,529 A | * 8/1999 | Buckley ........................... | 382/155 |

OTHER PUBLICATIONS

Masaki, A.; Hirai, Y.; Yamada, M., Neura networks in CMOS: a case study, IEEE Circuits and Devices Magazine, Vol.: 6 Issue: 4, Jul. 1990 pp: 12–17.*

Kondo, Y.; Koshiba, Y.; Arima, Y.; Murasaki, M.; Yamada, T.; Amishiro, H.; Shinohara, H.; Mori, H., A 1.2GFLOPS neural network chip exhibiting fast convergence, Solid–State Circuits Conference, 1994. Digest of Technical Papers, 41st ISSCC., 1994, IEEE Int.*

* cited by examiner

Primary Examiner—Wilbert L. Starks, Jr.
(74) Attorney, Agent, or Firm—Jay H. Anderson

(57) ABSTRACT

The neural semiconductor chip first includes: a global register and control logic circuit block, a R/W memory block and a plurality of neurons fed by buses transporting data such as the input vector data, set-up parameters, etc., and signals such as the feed back and control signals. The R/W memory block, typically a RAM, is common to all neurons to avoid circuit duplication, increasing thereby the number of neurons integrated in the chip. The R/W memory stores the prototype components. Each neuron comprises a computation block, a register block, an evaluation block and a daisy chain block to chain the neurons. All these blocks (except the computation block) have a symmetric structure and are designed so that each neuron may operate in a dual manner, i.e. either as a single neuron (single mode) or as two independent neurons (dual mode). Each neuron generates local signals. The neural chip further includes an OR circuit which performs an OR function for all corresponding local signals to generate global signals that are merged in an on-chip common communication bus shared by all neurons of the chip. The R/W memory block, the neurons and the OR circuit form an artificial neural network having high flexibility due to this dual mode feature which allows to mix single and dual neurons in the ANN.

10 Claims, 9 Drawing Sheets

NEURAL CHIP ARCHITECTURE AND NEURAL NETWORKS INCORPORATED THEREIN

FIELD OF THE INVENTION

The present invention relates to artificial neural network systems and more particularly to a novel neural semiconductor chip architecture having a common memory for all or part of the neurons integrated in the chip. This architecture is well adapted to the improved neuron described in the co-pending application cited below which has been designed to operate either as a single neuron or as two independent neurons. Artificial neural networks (ANNs) built with such neural chips offer maximum flexibility.

CO-PENDING PATENT APPLICATION

Improved neuron structure and artificial neural networks incorporating the same, Ser. No. 09/470,458, filed on the same date herewith.

BACKGROUND OF THE INVENTION

Artificial neural networks (ANNs) are more and more used in applications where no mathematical algorithm can describe the problem to be solved and they are very successful as far as the classification or recognition of objects is concerned. ANNs give very good results because they learn by examples and are able to generalize in order to respond to an input vector which was never presented. So far, most ANNs have been implemented in software and only a few in hardware, however the present trend is to implement ANNs in hardware, typically in semiconductor chips. In this case, hardware ANNs are generally based upon the Region Of Influence (ROI) algorithm. The ROI algorithm gives good results if the input vector presented to the ANN can be separated into classes of objects well separated from each other. If an input vector has been recognized by neurons belonging to two different classes (or categories), the ANN will respond by an uncertainty. This uncertainty may be reduced in some extent by the implementation of the K Nearest Neighbor (KNN) algorithm.

Modern neuron and artificial neural network architectures implemented in semiconductor chips are described in the following U.S. patents:

U.S. Pat. No. 5,621,863 "Neuron Circuit"
U.S. Pat. No. 5,701,397 "Circuit for Pre charging a Free Neuron Circuit"
U.S. Pat. No. 5,710,869 "Daisy Chain Circuit for Serial Connection of Neuron Circuits"
U.S. Pat. No. 5,717,832 "Neural Semiconductor Chip and Neural Networks Incorporated Therein"
U.S. Pat. No. 5,740, 326 "Circuit for Searching/Sorting Data in Neural Networks"

which are incorporated herein by reference. These patents are jointly owned by IBM Corp. and Guy Paillet. The chips are manufactured and commercialized by IBM France under the ZISC036 label. ZISC is a registered Trade Mark of IBM Corp. The following description will be made in the light of the US patents recited above, the same vocabulary and names of circuits will be kept whenever possible.

In U.S. Pat. No. 5,717,832 there is disclosed the architecture of a neural semiconductor chip (10) according to the ZISC technology. The ZISC chip includes a plurality of neuron circuits (11-1, . . . ) fed by different buses transporting data such as the input vector data, set-up parameters, . . . and control signals. Each neuron circuit (11) includes an individual R/W memory (250) and means for generating local result signals (F, . . . ), e.g. of the "fire" type and a local output signal (NOUT), e.g. of the distance or category type. An OR circuit (12) performs an OR function for all corresponding local result and output signals to generate respective first global result (R.) and output (OUT.) signals that are merged in an on-chip common communication bus (COM.-BUS) shared by all neuron circuits of the chip. An additional OR function can then be performed between all corresponding first global result and output signals to generate second global result and output signals, preferably by dotting on an off-chip common communication bus (CON..-BUS) in the driver block (19). This latter bus is shared by all the neural chips that are connected thereon to build an artificial neural network of the desired size. In the chip, a multiplexer (21) may select either the first or second global output signal to be re-injected in all neuron circuits of the neural network as a feed back signal depending on the chip operates in a single or multi-chip environment via a feed back bus (OR-BUS). The feedback signal results of a collective processing of all the local signals.

Unfortunately, the ZISC chip architecture is not optimized in terms of circuit density because many functions are decentralized locally within each neuron and thus are duplicated every time a neuron is added to the chip. This is particularly true for the local RAM which is implemented in each neuron circuit. During the learning and recognition phases, in the ZISC chip, the component addresses are sent to the local RAM memory of each neuron in sequence, the same set of addresses is thus processed by the RAM internal address decoder in each neuron circuit. The duplication of a decoder function in each neuron circuit produces an obvious waste of silicon room significantly limiting thereby the number of neuron circuits that can be integrated in the ZISC chip.

Moreover, in the ZISC chip, there is a discrepancy between the clock cycles of the input buses feeding the chip and those feeding the neuron circuits, so that the neuron processing capabilities are not fully exploited. For instance, only one distance is calculated during an external clock cycle, although it could have been possible to compute two distances, thereby wasting time during this operation.

In the ZISC chip architecture, there are four input data buses to feed each neuron, but only a few data need to be applied at the same time to a determined neuron circuit. A high number of unemployed buses at the chip level induces a high number of wires and drivers for electrical signal regeneration, which in turn, are a source of unnecessary silicon area consumption in the ZISC chip.

Finally, depending upon the application, the number of input vector components that is required is not necessarily the same. Some applications may need a high number of components while others not. If a chip is built with such a high number for a specific application, for an application requiring only a small number of components, a significant part of the memory space will not be used. In addition, the precision needed on the stored components (weights) may be different. For a determined prototype, some components may need a full precision (a maximum number of bits) while some other components may need a low precision (a low number of bits) instead. With the ZISC neuron architecture if low precision is needed for only a few components, all unused bits are wasted.

SUMMARY OF THE INVENTION

It is therefore a primary object of the present invention to provide a novel neural chip architecture that is adapted to use an on-chip common RAM memory to store prototype vector components (weights) for several neurons.

It is another object of the present invention to provide a novel neural chip architecture wherein the RAM memory is cut in slices, one for each neuron present in the chip.

It is another object of the present invention to provide a novel neural chip architecture wherein each RAM memory slice can be written independently of the others.

It is another object of the present invention to provide a novel neural chip architecture that is well adapted to an improved neuron capable to work either as a single neuron (single mode) or as two independent neurons referred to as the even and odd neurons (dual mode).

It is another object of the present invention to provide a novel neural chip architecture wherein in each RAM memory slice, the lower half addresses are assigned to the even neuron and the upper half addresses are assigned to the odd neuron.

It is another object of the present invention to provide a novel neural chip architecture to be provided with a masking function that allows a variable precision in the storage of the prototype components increasing thereby the number thereof.

It is another object of the present invention to provide an artificial neural network incorporated in such novel neural chip architecture for increased flexibility.

According to the present invention there is described a novel neural semiconductor chip comprising:

a global register and control logic block for storing input data, set-up parameters, . . . . and generating the control signals that are necessary to chip operation;

a plurality of N neurons that are fed in parallel by appropriate data and control buses, each neuron generating local signals;

R/W memory means common to all neurons that are cut into slices, every slice being adapted to store the prototype components of a neuron; and, OR means performing an OR function of all local signals outputted by said neurons to generate a global signal that is re-injected as a feed back signal in each neuron via a feed back bus.

The novel neural chip is well adapted to a neuron architecture designed to include:

a data bus (DATA-BUS) which transports the prototype vector components;

an input bus (INPUT-BUS) which transports the actual influence field (AIF) and its lower and upper limits (MaxIF/MinIF), the category, the distance and the norm/context data;

a feed back bus (OR-BUS) which transports feed back signals;

computation means connected to said data bus and input bus and to register means for calculating the distance between an input vector and the stored prototype to generate a signal D of the distance type and performing comparisons between data either stored in said register means or present on said buses and addition/subtraction operations on said data;

register means for storing data either transported on the said buses or generated by said computation means; and, evaluation means for determining the maximum or the minimum value between of a specific data stored in said register means or R/W memory means or present on said buses; and, daisy chain means connected to the corresponding daisy chain circuits of the two adjacent neurons when said improved neuron is part of an ANN for differentiating between its different possible states: free, first free and engaged;

wherein said register means, evaluation means and daisy chain means have a substantially symmetric structure, so that said improved neuron can operate either as a single neuron (single mode) or as two independent neurons (dual mode).

With this neuron architecture having a dual structure, there is disclosed a specific memory organization for a more efficient management. In single mode, the prototype components of a single neuron occupy the totality of the addresses of the R/W memory slice. In the dual mode, the first half of the addresses is dedicated to the even neuron and the second half to the odd neuron.

In addition, a mask function is implemented on the weight coefficients (prototype components) contained in the R/W memory. In essence, the role of this mask function is to cut a slice in parts, each part representing a set of prototype components with less bits, i.e. at the cost of a lower precision, but allowing to increase the number of components stored in each slice.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DESCRIPTION OF A PREFERRED EMBODIMENT

The Improved Neuron Architecture

Preliminary Note

In the present description, circuits/blocks that are different but may have some similarities with corresponding circuits/blocks described in U.S. Pat. No. 5,621,863 will bear the same numeral but with a prime. In addition, for the sake of illustration, the bus widths given in this patent are maintained whenever possible.

Figure 1:
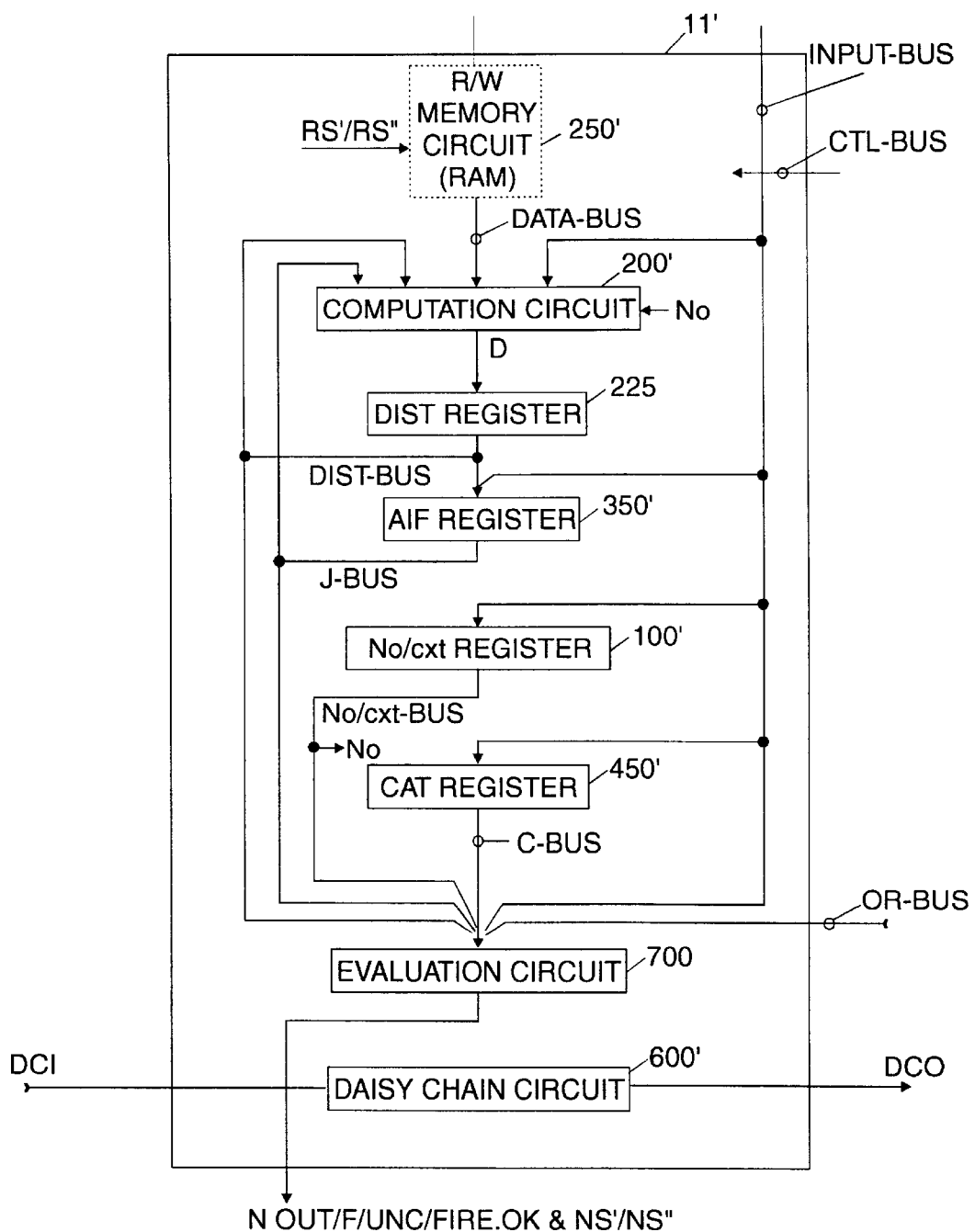
FIG. 1 shows the schematic block diagram of the improved neuron architecture of the present invention to illustrate its essential functional constituting blocks and main interconnections therebetween.

FIG. 1 schematically shows the architecture of the improved neuron according to the teachings of the co-pending application cited above. The improved neuron referenced 11' basically consists of a single computation block 200' and a number of blocks having substantially a symmetric or dual construction. A first series of blocks consists of registers to store data: the local norm and context (block 100'), the distance (block 225), the AIF value (block 350') and the category (block 450'). Block 700 is an evaluation circuit and block 600' is a daisy chain circuit. The improved neuron 11' of FIG. 1 needs some R/W memory capacity, e.g. a RAM memory, which may be placed either in the neuron (first variant) or outside (second variant). The optional presence of memory means in the improved neuron 11' is illustrated by memory block 250' in dotted line in FIG. 1 (the address bus has not been shown). As apparent in FIG. 1, four buses: the INPUT-BUS, the DATA-BUS, the OR-BUS and the CTL-BUS fed the improved neuron 11'. The INPUT-BUS is simultaneously applied to blocks 100', 200', 350', 450' and 700. The INPUT-BUS transports the actual influence field (AIF) and its upper and lower limits (MaxIF/MinIF), the 1-bit input norm and 7-bit input context data, the input category, the minimum distance, and finally the input vector components. On the other hand, the DATA-BUS which transports the prototype vector components is applied to one input of computation block 200'. The OR-BUS which transports feed back signals is applied to block 700. Finally, the CTL-BUS transports the control signals. All circuits in the blocks of FIG. 1 (except computation block 200' and control circuits) and in particular all the registers have a substantially symmetric or dual structure. The internal construction of these blocks and their respective operations will be described later on in this application.

Figure 2:
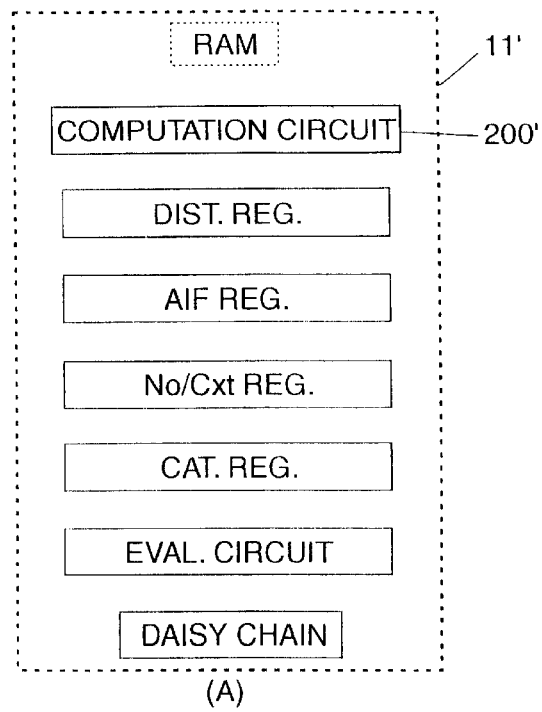
FIG. 2 schematically shows the organization of the functional blocks of the improved neuron of FIG. 1 depending upon it works as a single neuron (A) or as two independent neurons, referred to as the even and odd neurons (B).
Figure 2:
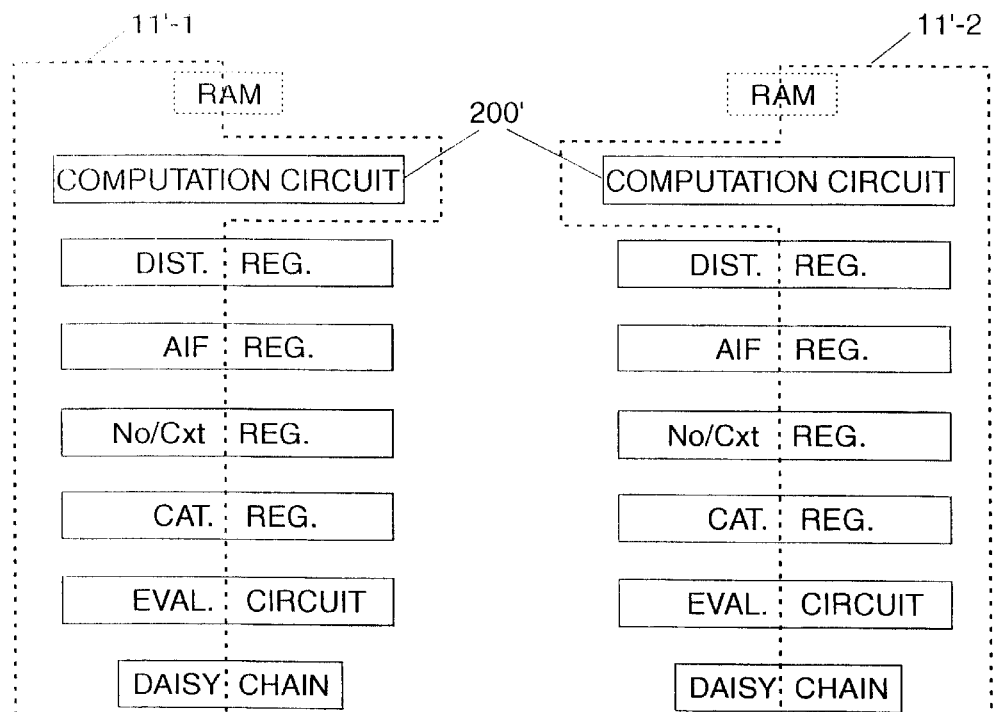

Now turning to FIG. 2, the improved neuron 11' of FIG. 1 may work either as a single neuron still referenced 11' (single mode) as shown in (A) or as two independent neurons 11'-1 and 11'-2 (dual mode) as depicted in (B). In the latter case it must be understood that the computation block 200', which is common to neurons 11'-1 and 11'-2, must operate sequentially to service one neuron after the other. The selection between these two possible operating modes (single/dual) is made by the user which uses a specific signal M (M stands for Mode) stored in a dedicated 1-bit register which exists in each improved neuron 11' control logic circuitry. Neurons 11'-1 and 11'-2 will be referred to hereinbelow as the even and odd neurons respectively when there is a special need of distinction therebetween or under the broad term of dual neurons when this distinction is not necessary. Finally, when the distinction between the two types of neurons (single vs dual) is irrelevant, only the notation "improved neuron" will be used.

Figure 3:
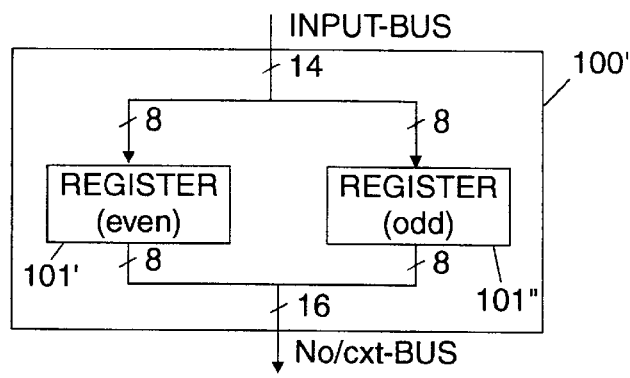
FIG. 3 shows the internal construction of the norm/context block 100' of FIG. 1.

Block 100' is still referred to as the local norm/context (No/cxt) register. The output of the block 100' is the No/cxt-BUS which transports the 1-bit input norm No and 7-bit input context cxt signals. Once the input norm and context data emitted by the user have been stored in the local No/cxt register 100' of each neuron 11', the 7-bit context becomes available on the No/Cxt-BUS for exploitation in block 700 control logic. On the other hand, the 1-bit norm is connected to the control logic of compute block 200' (see FIG.1). FIG. 3 shows the typical circuit structure of block 100' which is comprised of two 8-bit registers 101' and 101". Register 101' (101") is used to store the norm (1 bit) and the context (7 bits) for the even (odd) neuron in the dual mode. In the single mode, only one register is used, the other is free for any other task.

As soon as the user has decided that an input vector should be learned by the ANN, the decision of engaging a free neuron or to proceed to the reduction of the AIF value of the engaged neurons that have wrongly fired belongs to the ANN itself. At the end of the engagement process, the contents of the norm/context register 100' are automatically loaded with the global norm/context from the INPUT-BUS. The context can be advantageously used to differentiate different types of input vectors. For instance, the context data may be used to distinguish between the upper case and the lower case characters (or more generally to distinguish between different type fonts). As a consequence, the context approach will allow to select the improved neurons having learned with a determined context and to inhibit all others in the ANN. Each time the user changes the global context, this value is compared with the local context. If found identical, the neuron 11' will be selected, otherwise it will be inhibited. This comparison is performed in the evaluation circuit 700 of FIG. 1 which stores and generates a signal labeled NS (NS stands for Neuron Selection) to select or not a determined neuron as it will be discussed in due time.

The DATA-BUS, INPUT-BUS, DIST-BUS and the J-BUS are applied to the inputs of block 200' which is a multi-norm distance evaluation/comparison circuit that is adapted to perform the four arithmetic and right shift operations. The local norm signal No is applied to a control input of block 200' to select the desired calculation algorithm through an appropriate circuitry implementation in block 200'. Block 200' basically includes two adders and its main role is to evaluate the distance D between the input vector and prototype vector which is stored in the RAM memory of neuron 11' according to the norm selected by the user. In the present instance, each neuron 11' can calculate either the MANHATTAN distance (L1norm) i.e. D=sum(abs(Ak−Bk)) or the SQUARE distance (Lsup norm), i.e. D=max(abs(Ak−Bk)) wherein variable k takes every value from 1 to n (the number of components). Note that "abs" is an usual abbreviation for "absolute value".

Figure 4:
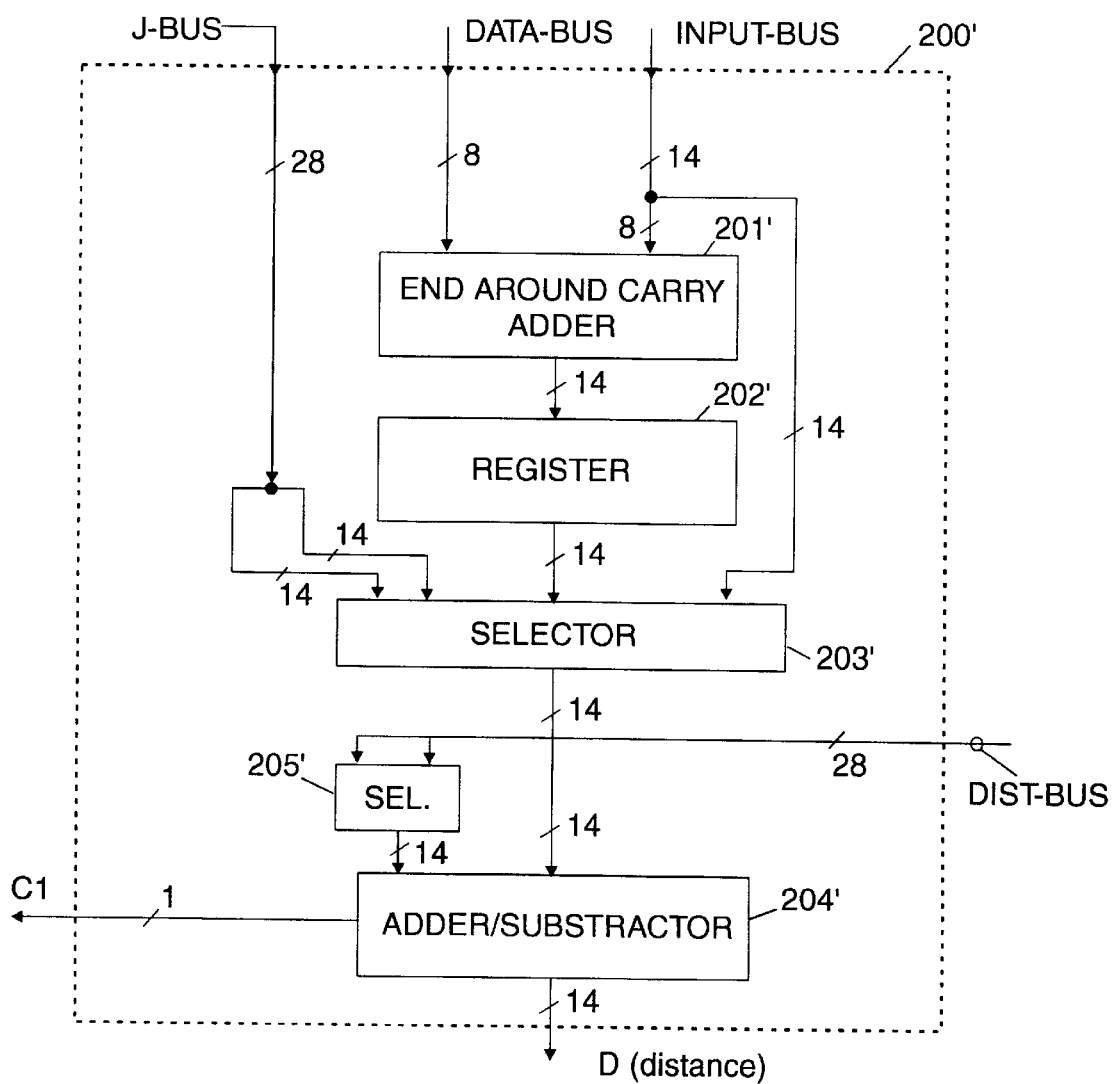
FIG. 4 shows the internal construction of computation block 200' of FIG. 1.

FIG. 4 shows an example of a circuit adapted to perform the essential functions of block 200'. As apparent in FIG. 4, block 200' is first comprised of two circuits referenced 201' and 202'. Circuit 201' is an end-around carry adder having the right shift capabilities mentioned above and circuit 202' is a register. These circuits are used to compute the elementary distance between an input vector component and the corresponding prototype vector component (weight) stored in the RAM memory. The distance is obtained the same way as described in the above mentioned US patent, except the polarity of the result which can be changed depending on the carry generated by adder 201'. A selector 203' allows to select either the J-BUS, the output of register 202', or the INPUT-BUS as the first input of circuit 204' or to force a determined logic value at its output (as standard in selectors). The selector 205' selects the even distance during the distance evaluation of the even neuron and the odd distance during the distance evaluation of the odd neuron. Its output is connected to the second input of circuit 204'. Circuit 204' is an adder/subtractor which plays several roles, it may add and subtract data, but it can also be transparent to the flow of input data. Block 200' is also used in the ROI mode when the distance is compared with the AIF in block 350'. In this case, the selector 203' is used to select either the even or odd part of the J-BUS. Likewise, adder/subtractor 204' makes this comparison in two phases. As soon as one elementary distance has been computed, it is processed (according to the selected norm) to provide the distance between the input vector and the prototype vector stored in the RAM memory. Circuit 204' performs additions (L1 norm) or substractions/comparisons (Lsup norm). The results are a 1-bit signal which is labeled C1 in FIG. 4 and the distance D. Because, block 200' is common to both even and odd neurons, the distance evaluation process needs to be split in two phases in the dual mode. In this case, block 200' computes first the distance for the even neuron then for the odd neuron. As a result, two distances are obtained.

Figure 5:
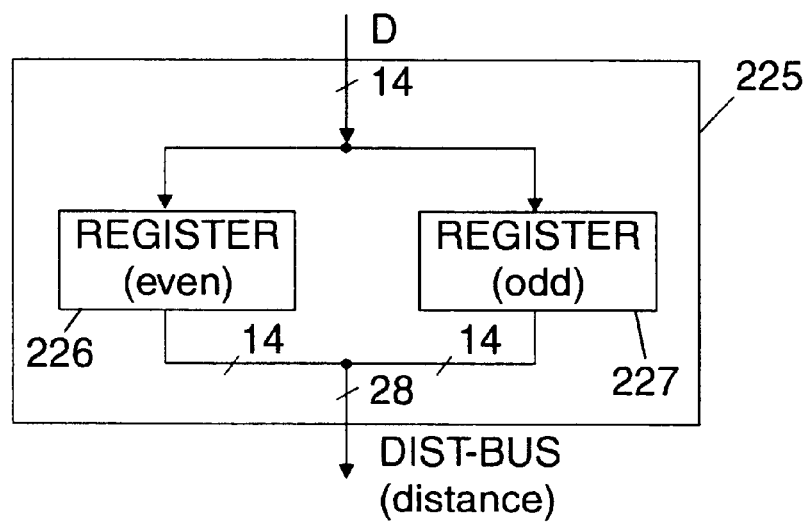
FIG. 5 shows the internal construction of the distance register block 225 of FIG. 1.

Once it has been determined by block 200', the distance D signal, which is either one distance (single mode) or two distances (dual mode) is stored in the distance register 225. The latter is therefore comprised of two distinct registers or (parts of a same register), one for the even neuron and the other for the odd neuron, referenced 226 and 227 respectively in FIG. 5. When the neuron 11' works as a single neuron, distinction between these registers is irrelevant, the distance D can be stored in either one (or in the two as well for maximum precision). The output of distance register 225 is labeled DIST-BUS as it transports the 28-bit distance signal which is applied to blocks 200', 350' and 700.

Figure 6:
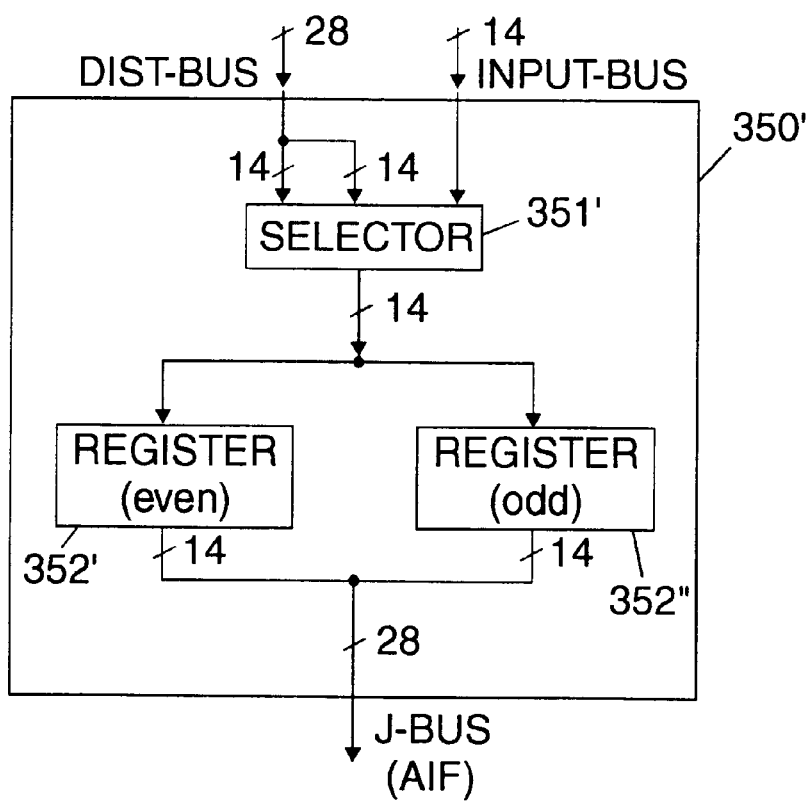
FIG. 6 shows the internal construction of the AIF register block 350' of FIG. 1.

In substance, the AIF register block 350' contains registers for storing the AIF values of the even and odd neurons. The contents of these registers are used when the ROI mode is selected. In this mode, the distances computed in sequence in block 200' for the even and odd neurons are compared with the corresponding AIF values in block 350'. These comparisons are performed in block 200' via the J-BUS. As apparent in FIG. 6, AIF register block 350' is comprised of a three-way multiplexer 351' and two 14-bit AIF registers 352' and 352". The multiplexer 351' receives the 14-bit INPUT-BUS and the 28-bit DIST-BUS which transports the distance for the odd and even neurons. During the learning phase, one of AIF registers (352'/353') is loaded with a value whose maximum is given by MaxIF via the INPUT-BUS. The AIF value which is loaded in the first free neuron circuit is either Dmin (the distance between the input vector and the nearest neighboring neuron), MinIF or MaxIF. Since then, the contents of this AIF register are subject to changes during the subsequent learning phases whenever required. The AIF value of a prototype vector is equal to either the distance D calculated by block 200', MinIF (if D<MinIF) or MaxIF (if D>MaxIF) at the end of the reduction process. The AIF value cannot be changed during the recognition phase, but only during a learning phase. Signal J corresponding to said AIF values is outputted from AIF register block 350' on the 2×14-bit J-BUS. In the dual mode, the J signal thus transports the AIF values for both even and odd neurons.

Figure 7:
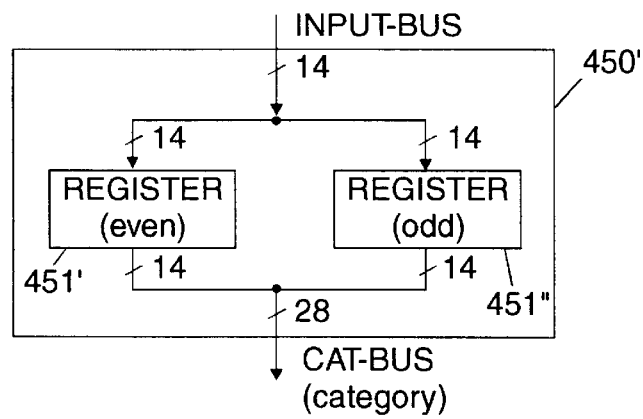
FIG. 7 shows the internal construction of the category register block 450' of FIG. 1.

The role of block 450' is to store the categories associated to the even and odd neurons. As shown in FIG. 7, block 450' consists of two conventional 14-bit registers 451' and 451" to store the input category CAT supplied by the user on the INPUT-BUS during the learning phase as the local category. At initialization, the contents of registers 451' and 451" are equal to zero. The bus which is connected to the output of block 450' is labeled C-BUS. It transports the local category C. During the recognition phase, categories are taken into account in the evaluation circuit 700 via the C-BUS.

The role of evaluation circuit block 700 is to perform local and global evaluations. The generation of the NS signal (in fact in this case two signals NS' and NS") is the result of a local evaluation while the minimum distance determination is a global evaluation. Another key feature of the improved neuron 11' architecture of FIG. 1 lies in the innovative design of block 700 which is schematically illustrated in FIG. 8.

Figure 8:
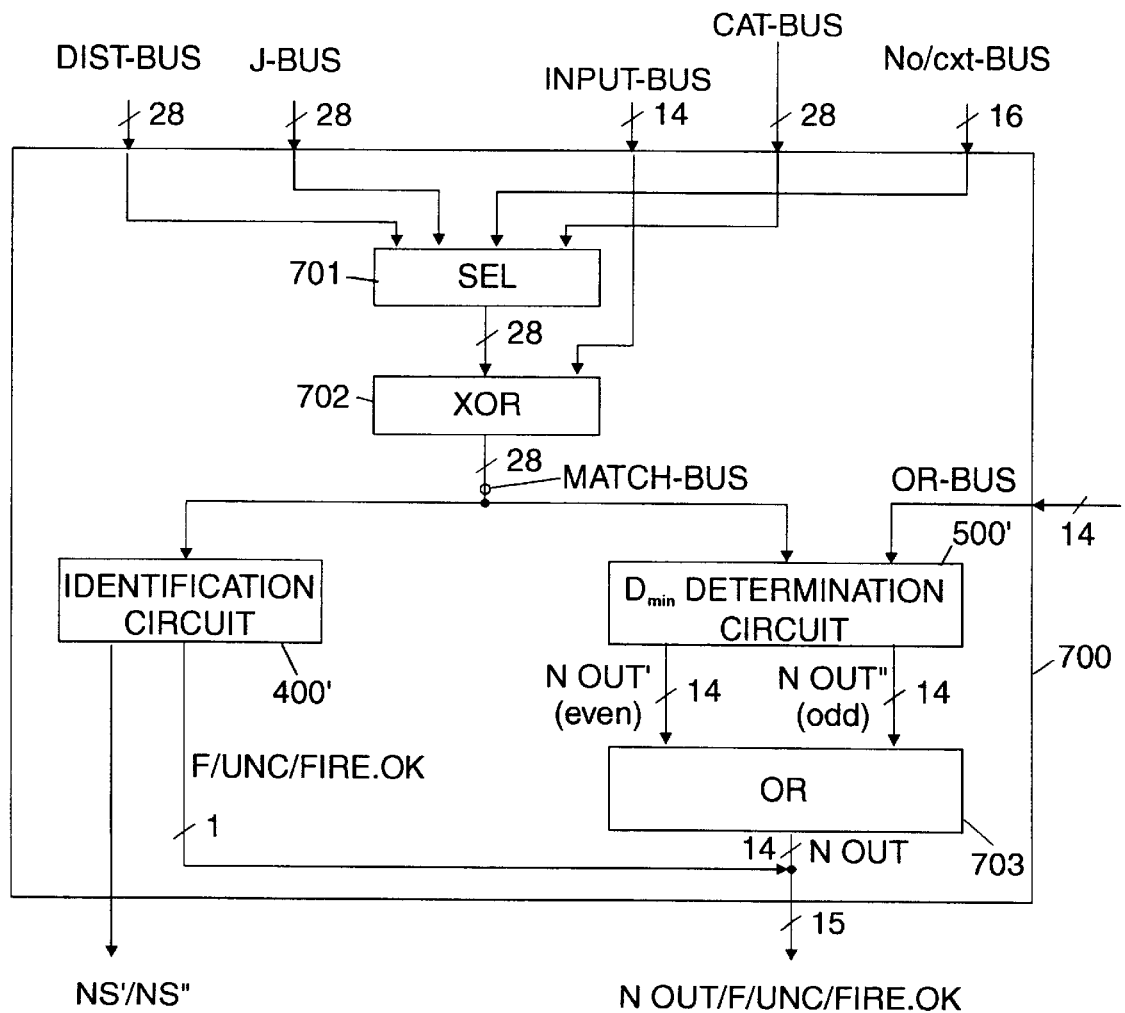
FIG. 8 shows the schematic block diagram of the evaluation block 700 of FIG. 1 which includes an identification circuit 400' and a Dmin determination circuit 500'.

As apparent in FIG. 8, block 700 is connected to the DIST-BUS, INPUT-BUS, the No/cxt-BUS, J-BUS, OR-BUS and the C-BUS. Block 700 includes a 4-ways multiplexor or selector 701 which inputs are the DIST-BUS, J-BUS, No/cxt-BUS and the C-BUS. The output of block 701 is applied to a XOR circuit 702 which is mainly used to perform a comparison or to invert the polarity of the signal generated by selector 701 to allow the maximum searching process. XOR circuit 702 is comprised of two 14-bit XOR circuits (not shown) receiving two 14-bit signals corresponding to the even and odd parts of the 28-bit signal outputted by selector 701 and the 14-bit signal available on the INPUT-BUS to output a 28-bit signal on a bus labeled MATCH-BUS which is applied to blocks 400' and 500'.

Block 400' is an innovative identification circuit whose primary function is to make apparent whether the input vector has been recognized or not by the neuron 11' during the recognition phase in the ROI mode. Moreover, it performs the comparison between the local and global norm/context values. Block 400' locally generates a 1-bit local/global signal referred to as the F/UNC/FIRE.OK signal (to be consistent with the equivalent signal in the ZISC chip) because this signal will be used at different times with different meanings. Moreover, this local/global signal is important for the generation of global signals that are representative of the response of the ANN as a whole to the input vector presentation. Block 400' is shown in more details in FIG. 9.

Figure 9:
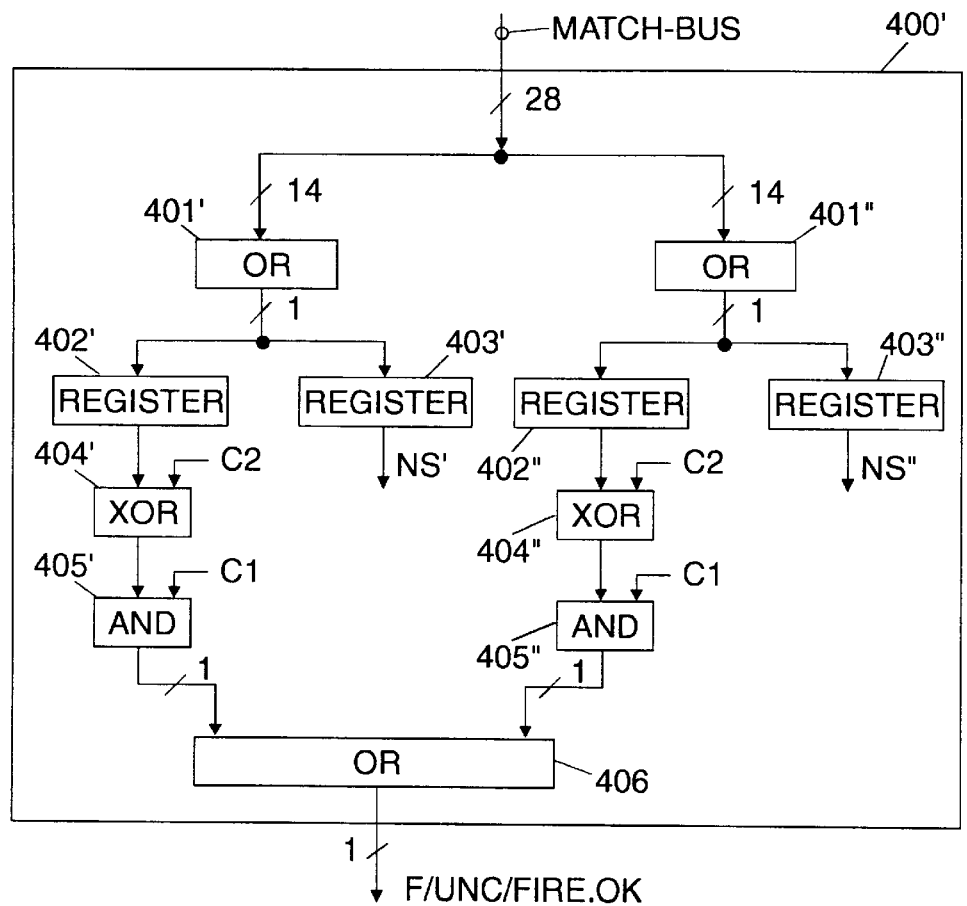
FIG. 9 shows the internal construction of the identification circuit 400' of FIG. 8.

Now turning to FIG. 9, block 400' includes two 14-bit OR gates 401' and 401" to perform an OR operation on the signals present on the MATCH-BUS. The output of OR gate 401' (401") is connected to a pair of registers 402' and 403' (402",403"). Register 402' (402") stores a binary information related to the category matching, i.e. if the local category matches with the input category, a logic '1' is stored in this register 402' (402") and a logic '0' in the contrary case. The output of register 402' (402") is connected to a XOR gate 404' (404") to invert the polarity of its input signal depending the value of a control signal C2. Control signal C2 allows to determine if at least one neuron has fired with the right category (meaning of FIRE.OK) or if at least one has fired with a wrong category (meaning of UNC). For instance, C2 is set to 0 to indicate a matching. The signal outputted by XOR 404' (404") is gated in AND gate 405' (405") by control signal C1 which indicates whether the neuron has fired or not (it is generated in block 700) as a result of the distance/AIF comparison. The outputs of AND gates 405' and 405" are applied to an OR circuit 406 to generate the 1-bit global signal labeled F/UNC/FIRE.OK common to both even and odd neurons.

The signal which is generated by OR gate 401' (401") is also used to determine whether the local context matches with the global context. The result is stored in the register 403' (403"). This register thus contains the neuron selection represented by signal NS' (NS"). The NS signal (NS' and/or NS") is set active to enable a neuron to communicate with the other neurons of the ANN. Signal NS will be applied to certain blocks of the improved neuron 11' of FIG. 1 for enabling or disabling them as the case may be. In single mode, both NS' and NS" are active, unlike in the dual mode where only one is active (NS' for the even or NS" for the odd neuron).

Figure 10:
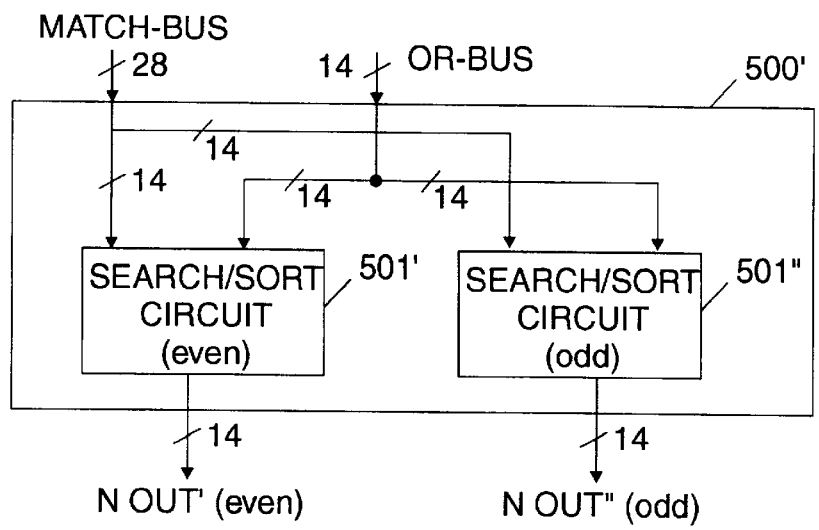
FIG. 10 shows the internal construction of the Dmin determination circuit 500' of FIG. 8.

As apparent in FIG. 10, block 500' is a Dmin determination circuit composed of two SEARCH/SORT circuits 501' and 501" that are identical in substance to circuit 502 described in U.S. Pat. No. 5,621,863. The two 14-bit NOUT' and NOUT" signals that are outputted from block 500' are applied to the 2-way OR circuit 703 in block 700 shown in FIG. 8. The signal at the output of OR circuit 703 is a global signal labeled NOUT which is merged with the 1-bit F/UNC/FIRE.OK signal on a 15-bit width bus labeled NOUT/F/UNC/FIRE.OK.

Figure 11:
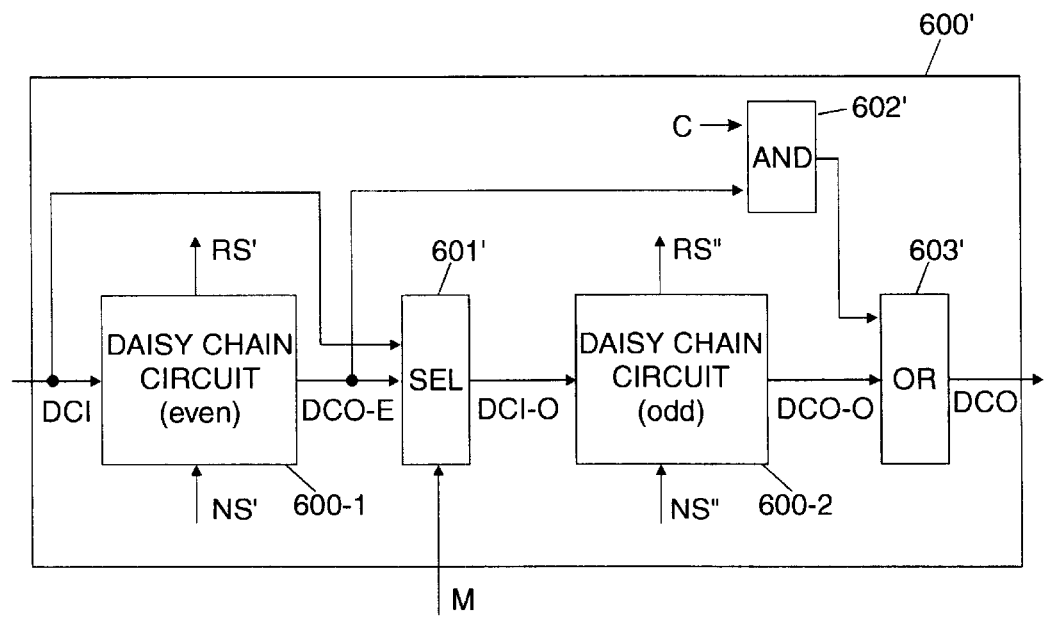
FIG. 11 shows the internal construction of the daisy chain block 600' of FIG. 1.

Block 600' shown in FIG. 11 is still another further innovative feature of the improved neuron 11' of the present invention. Block 600' essentially is a daisy chain circuit which allows a serial connection with similar daisy chain circuits of the two adjacent neurons, so that as mentioned above, every improved neuron 11' is adapted to form a chain like structure.

Now turning to FIG. 11, block 600' is constructed around two conventional daisy chain circuits 600 described in U.S. Pat. No. 5,621,863 labeled 600-1 and 600-2 that are connected in series with a selector 601' connected therebetween. The NS' and NS" signals (NS' for the even and NS" for the odd neuron) are applied to circuits 600-1 and 600-2 with the same role that signal NS in daisy chain circuit 600. The role of RS' and RS" signals (RS' for the even and RS" for the odd neuron) is the same as signal RS generated from daisy chain circuit 600. In the ZISC chip, RS is a control signal which allows the components of the input vector to be stored in the R/W memory circuit 250 of the first free neuron. The RS signal is determined from the logic values of the daisy chain circuit input and output signals. The selector 601' selects between signal DCI and the signal DCO-E generated by daisy chain circuit 600-1. It is controlled by the operating mode bit M mentioned above. An AND gate 602' receives this signal DCO-E and another operating mode 1-bit signal C. If C is active (e.g. C=1), the odd neuron is inhibited. C is set active when the even neuron has been engaged and then the user needs to engage not another dual neuron but a single neuron. This feature allows to mix single and dual neurons in the ANN at user's will. The outputs of AND gate 602' and daisy chain circuit 600-2 are connected to the inputs of an OR gate 603'. The signal outputted by OR gate 603' is the DCO signal as standard for the improved neuron 11'.

The 1-bit register placed in each circuit 600-1 and 600-2 stores the state of the corresponding dual neuron. After initialization, these registers contain a zero. During the learning phase, a value of one for the DCI signal indicates that the preceding neuron (single or dual) in the chain has already stored a prototype vector. In the single mode (M=1), we need to have both signals RS' and RS" active at the same time. Selector 601' selects the signal DCI (DCI=1) as DCI-O, because the contents of the two 1-bit registers in daisy chain circuits 600-1 and 600-2 are equal to zero, this desired result is achieved. The improved (single) neuron is the first free neuron. In the dual mode (M=0), to designate the even neuron as the first free neuron requires to have RS' active and RS" inactive. We have DCI=1 and DCO-E=0, the selector 601' selects signal DCO-E as DCI-O, so that the even neuron is the first free (the odd neuron is still free). When the value of '1' representing the DCI signal is latched in the 1-bit register of daisy chain circuit 600-1 to engage the even neuron, then DCO-E=1 as DCI-O, RS' becomes inactive and signal RS" becomes active and the odd neuron now is the first free "ready to learn" neuron.

The Novel Neural Chip Architecture

Figure 12:
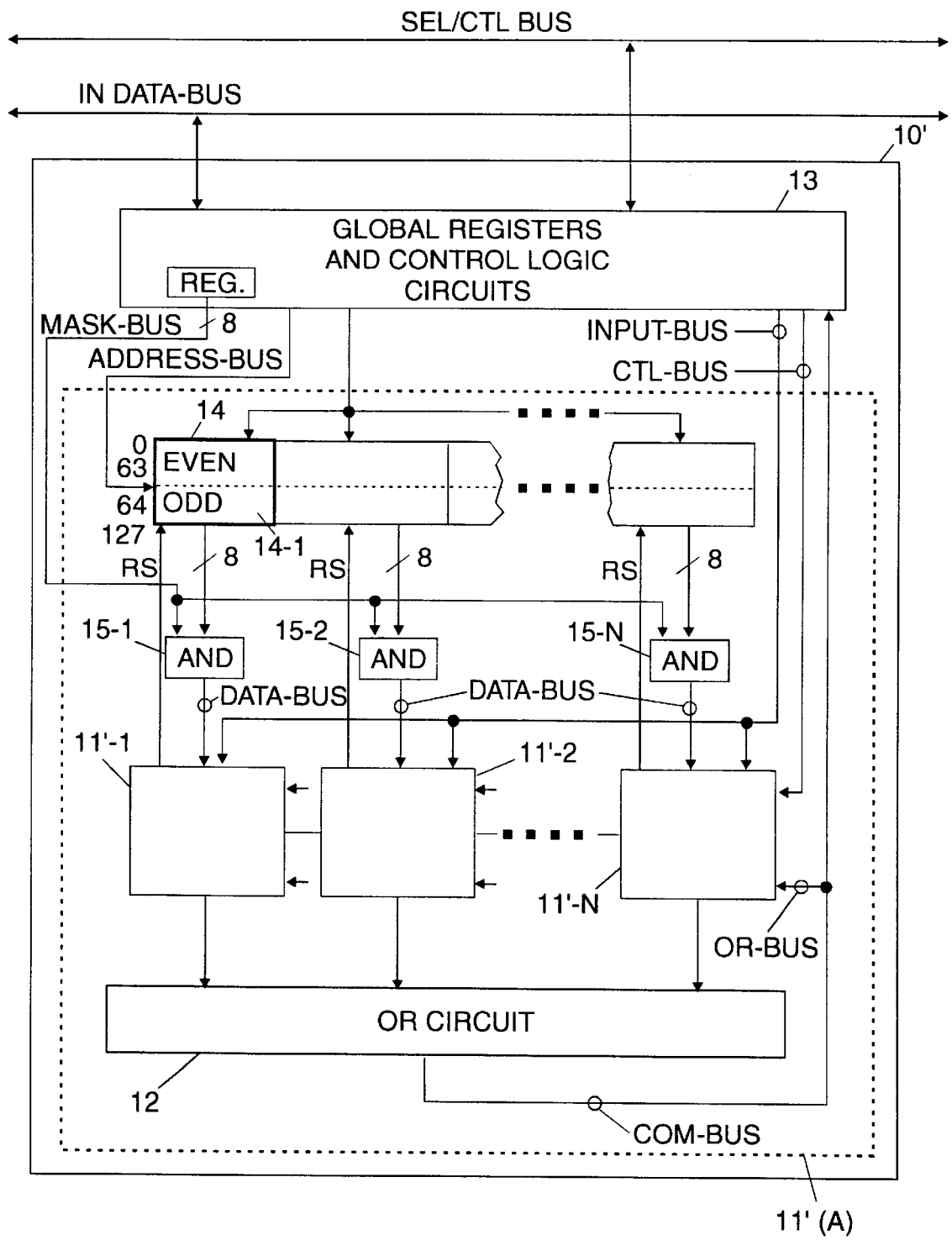
FIG. 12 schematically shows the block diagram of a neural semiconductor chip architecture well adapted to the improved neuron of FIG. 1 (the variant without R/W memory) that has been specially designed for working alone.

In FIG. 12, there is shown the schematic block diagram of the architecture of a novel neural chip that has been designed to primarily implement a common R/W memory for all the neurons of the chip. Preferably, but not mandatory, these neurons can be of the FIG. 1 improved neuron 11' type. For instance, the ZISC neurons 11 without the R/W memory block 250 would be adequate as well. Let us assume for the following description that the novel chip architecture referenced 10' includes a plurality of said improved neurons referenced 11'-1 to 11'-N to generate local and global signals. The chip architecture illustrated in FIG. 12 is designed for working alone. According to this implementation, the inter-neuron communication system is comprised of block 12 (an OR circuit in substance) and an on-chip common communication bus labeled COM-BUS.

The connections between certain blocks of chip 10' and the user are illustrated by the 16-bit bi-directional input data bus labeled INDATA-BUS which transports the input data and a SEL/CTL-BUS which transports selection and control signals as described in U.S. Pat. No. 5,621,863. Chip 10' includes a global register and control logic circuit block 13 which interfaces with the two buses mentioned above: the INDATA-BUS and the SEL/CTL-BUS. This block 13 includes all the global registers and the circuits generating the control signals that are necessary to chip 10' operation. In particular, block 13 is used to store the global norm/context value, different set-up parameters (such as MaxIF and MinIF values), and inputs (such as the input category, input vector components, . . . ).

As said above, memory capabilities illustrated by R/W memory 250' in FIG. 1 are a requisite for the improved neuron 11'. According to the present invention, the RAM memory is placed outside the neuron and consists to have a memory block common to a number of improved neurons 11'. In FIG. 12, the memory block is a RAM memory which bears numeral 14. Let us assume this RAM memory 14 is a 128. 8. N bits (N being the number of improved neurons 11'). The single neuron 11' requires the whole set of addresses 0 to 127. In dual mode, addresses 0 to 63 are used for the even neuron 11'-1 and addresses 64 to 127 are used for the odd neuron 11'-2. This RAM memory 14 is shared by all the improved neurons 11'-1 to 11'-N (addresses are common). The memory space assigned to an improved neuron (or a single neuron) is a slice of 128. 8 bits and therefore the memory space assigned to each dual neuron is 64. 8 bits. Moreover, as it will be discussed later on, a slice can be cut in parts. The first slice in memory 14 paired with neuron 11'-1 is made apparent in FIG. 12 where it bears reference 14-1. An ADDRESS-BUS and a data bus (not shown) are used to address and write in the RAM memory as standard.

During the learning phase, each time the user presents an input vector, this input vector is written in the RAM 14 depending upon the values of the RS' and RS" signals. In single mode, addresses 0 to 127 are selected in sequence and if a "ready to learn" neuron exists, its corresponding RS' and RS" signals are activated to store the input vector components in the corresponding slice of the memory as a potential prototype thanks to the Byte Write capability. On the other hand, in dual mode, depending upon the dual neuron type, either addresses 0 to 63 (for an even neuron) or 64 to 127 (for an odd neuron) are written still for a RAM memory slice. In dual mode, a slice thus contains the stored components for the even and odd neurons coded on 8 bits, so that the 8-bit data-bus DATA-BUS is adapted for a dual neuron. The Byte Write feature allows to write only in a specific slice of the RAM memory 14 without modifying the other slices. The RS' and RS" signals allow to write all the components of either one (single mode) or two prototypes (dual mode) in a memory slice. Note that, during this phase, the components are loaded only in the first free "ready to learn" neuron (irrespective it is a dual or a single neuron).

During the recognition (distance evaluation process), the compute unit 200' computes the distance between the input vector on the INPUT-BUS and the prototype stored in the RAM. Two cases must be distinguished. In the single mode, where the even and odd neurons 11'-1 and 11'-2 are merged to form a single neuron 11', we have now a neuron capable to address 128 components. In a continuous process, the RAM address will be incremented from address 0 to 127 to compute the distance between the input vector and the prototype vector. In the dual mode, the two neurons 11'-1 and 11'-2 are capable to address 64 components each. In this case, the recognition process is split in two phases. In the first phase (evaluation of the distance for the even neuron), the input vector is compared with the prototype stored in the RAM at addresses 0 to 63. In the second phase (evaluation of the distance for the odd neuron), the input vector is compared with the prototype stored in the RAM at addresses 64 to 127. Note that in this case, the components of the input vector are compared twice without the need of sending it twice on the INPUT-BUS.

Now according to another important aspect of the present invention, block 13 includes a specific register for masking purposes. The dedicated output bus is labeled the MASK-BUS in FIG. 12. The MASK-BUS is applied to one input of AND gates 15-1 to 15-N which are placed between the RAM memory 14 and each improved neuron 11'. The principal role of these AND gates is to perform a mask function on the weight coefficients (prototype components) contained in the RAM memory 14. In essence, the role of this mask function is to cut a slice in parts, each part representing a set of prototype components with less bits, i.e. at the cost of a lower precision but allowing to increase the number of components stored in each slice.

For instance, when an application needs a low precision on the components of a specific prototype, in this case, only a few bits are required. The architecture of neural chip 10' shown in FIG. 12 allows to implement this desired feature. For instance, AND gate 15-1 inserted between the RAM memory 14 and the DATA-BUS transmits 8 bits from the RAM memory bit slice 14-1 to the computation block 200' of the improved neuron 11'-1 but validates only some of them. Let us assume that we are in the single mode and consider the 128 components (coded on 8 bits) of a stored prototype. These components may be split in two sets of 128 components each coded on 4 bits. The distance evaluation will still be split in two phases. In the first phase, the mask is set to '00001111' in order to take in account bit0 to bit3. The first set of components is inputted in the computation block 200', 128 elementary distances are computed and a first intermediate distance obtained. After this first distance evaluation, the mask is set to '11110000' in order to take in account bit4 to bit7 and the second set of components is inputted in the computation block 200'. Again, 128 elementary distances are computed and combined with the said first intermediate distance to evaluate the final distance between the input vector and the prototype. This behavior is equivalent to the processing of an input vector having 256 components coded on 4 bits. Note that there is a significant difference in terms of precision between the two sets, the first set uses the 4 LSBs while the second set uses the 4 MSBs. This feature can be advantageously used if the application needs to differentiate between two sets of components, for instance giving more importance to one set. However, it is possible to have two balanced sets if a shift register is used in computation unit 200' to re-normalize each elementary distance. Using the mask feature, a single neuron with 128 components of 8 bits can be expanded to a single neuron of 1024 components of 1 bit allowing thereby an additional outstanding flexibility to the neural chip architecture of FIG. 12. This feature finds application for instance, when the input data can be coded on 1 bit (as it is the case in black and white images). When a 8-bit precision is required, the value of the mask is set to '11111111'.

As apparent in FIG. 12, all the improved neurons 11'-1 to 11'-N have a serial connection so that they are structured as a chain to form an artificial neural network (ANN) referenced 11'(A). Note that in this case, the DCI signal of the first neuron in the ANN must be active (i.e. at '1').

However, still according to the present invention, the chip architecture described in FIG. 12 can be easily modified by adding an external output bus to extend its usage to a multi-chip environment operation producing thereby an artificial neural network of a substantially unlimited size. This variant will now be described hereafter in conjunction with FIG. 13. This is accomplished by assembling the adequate number of chips 10' once adapted that way to operate in such a multi-chip environment. To that end, should a plurality of chips 10' be assembled, the global signals generated by said plurality of chips 10' are ORed on another common communication bus included in the inter-neuron communication system. This common communication bus is now necessarily located outside the chips 10' and will be referred to hereinbelow as the off-chip common communication bus. Preferably, this additional OR function is performed by adequate driver circuits directly on the said off-chip common communication bus.

Figure 13:
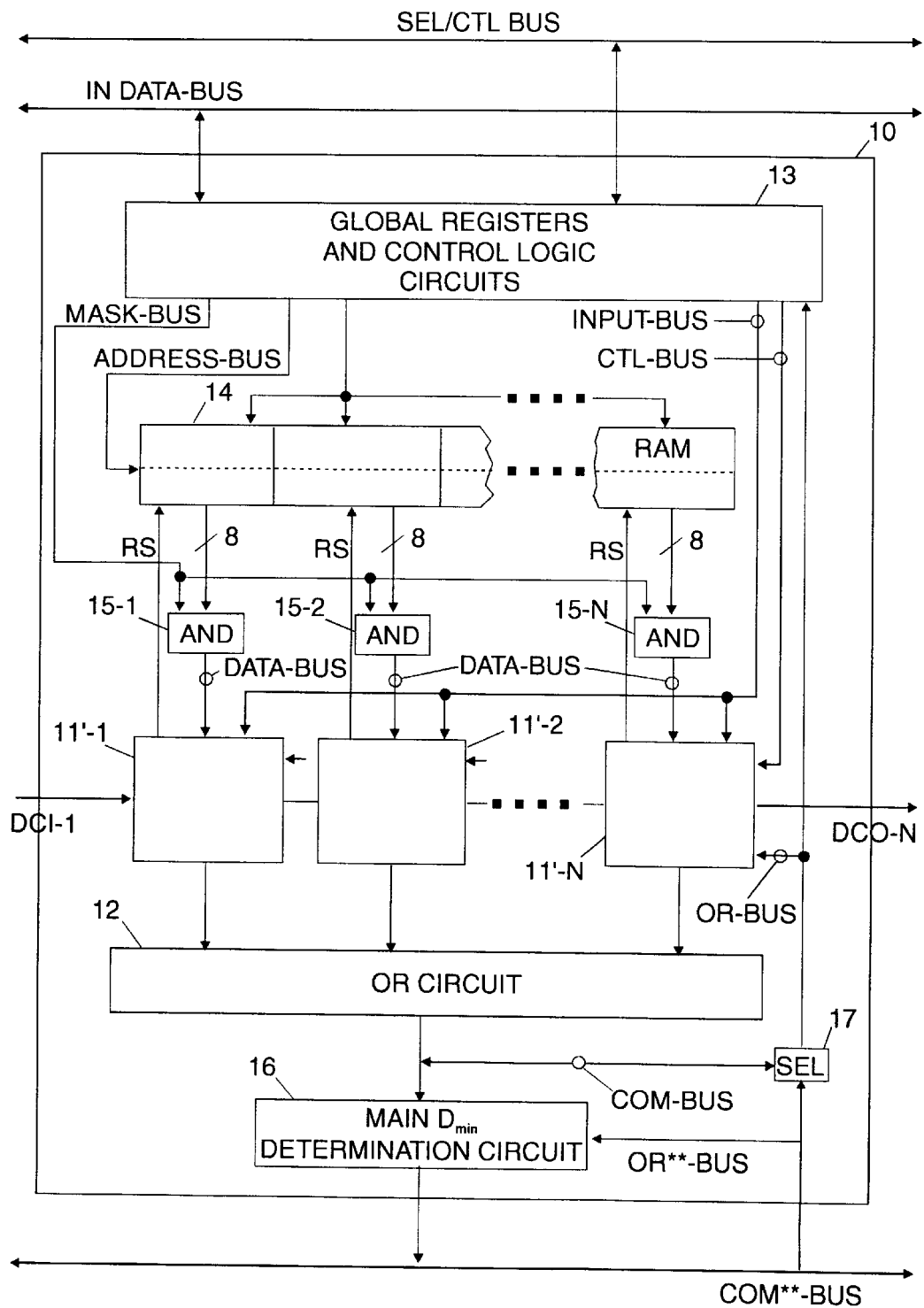
FIG. 13 schematically shows a variant of the neural semiconductor chip architecture of FIG. 12 that has been specially designed for working either alone or in a multi-chip environment.

Now turning to FIG. 13, the COM-BUS is connected to the input of a block 16 which has the same role as the main Dmin determination circuit referenced 20 in FIG. 4B in U.S. Pat. No. 5,621,863. Circuit 16 is provided with a connection to a feed back bus labeled OR.-BUS which is a part of the COM.-BUS. To offer both one-chip and multi-chip environment options, the chip 10' is preferably provided with a selector circuit 17 which permits the user to select either the internal COM-BUS (if a single chip 10' is used) or the external COM.-BUS (in a multi-chip environment). This implementation illustrated in FIG. 13 is preferred because it is adapted to any type of application.

The greatest advantage offered by the present invention is to provide a RAM memory common to a number of neurons integrated in the chip. This RAM memory has a specific slice organization for an efficient memory management. When this chip architecture is further combined with the improved neuron architecture described above that can work either as a single neuron components or as two independent neurons it results a significant saving in terms of silicon room.

What is claimed is:

1. A neural semiconductor chip comprising:
   a global register and control logic block for storing input data and set-up parameters and for generating control signals for chip operation;
   a plurality of neurons that are fed in parallel by data and control buses to generate local signals, each neuron including a data bus (DATA-BUS) which transports prototype vector components, an input bus (INPUT-BUS) which transports an actual influence field (AIF) and lower and upper limits thereof (MaxIF/MinIF), a category, a distance and norm/context data, a feed back bus (OR-BUS) which transports feed back signals, computation means, connected to said data bus and input bus and to register means, for performing computation including calculating the distance between an input vector and a stored prototype vector to generate a distance signal, performing comparisons between data stored in said register means or present on said buses, and performing addition/subtraction operations on said data, register means for storing data transported on said buses or generated by said computation means, evaluation means for determining one of a maximum value and a minimum value of data stored in at least one of said register means and R/W memory means or present on said buses, daisy chain means, connected to corresponding daisy chain means of two adjacent neurons when each said neuron is part of an artificial neural network (ANN), for differentiating between different possible states of each said neuron (free, first free and engaged), wherein said register means, said evaluation means and said daisy chain means have a substantially symmetric structure, R/W memory means, common to all neurons, cut into slices for storing the prototype components of a neuron, adapted to store prototype vector components, and OR means for performing an OR function of all local signals outputted by said neurons to generate a global signal that is re-injected as a feed back signal into each neuron via the feed back bus; and logic control means for causing a neuron to operate either as a single neuron (single mode) or as two independent neurons (dual mode) characterized as even and odd neurons.

2. The neural semiconductor chip of claim 1 wherein said R/W memory is a RAM memory and every slice includes P×M bits where P is the number of addresses and M is the number of bits to code a prototype component.

3. The neural semiconductor chip of claim 2 wherein P represents the maximum number of prototype components of a single neuron (single mode).

4. The neural semiconductor chip of claim 2 wherein P/2 represents the maximum number of prototype components of either the even or the odd neuron (dual mode).

5. The neural semiconductor chip of claim 4 wherein in the RAM the lower half addresses represent the even neuron and the lower half addresses represent the odd neuron in the dual mode.

6. The neural semiconductor chip of claim 2 further comprising:

means for writing only in a slice and not in others slices of the RAN memory.

7. The neural semiconductor chip of claim 2 further comprising:

means for writing bits only in a specific part of a slice.

8. The neural semiconductor chip of claim 2 wherein said writing means allows to write either in the MSBs or in the LSBs of a determined address of the RAM memory slice to increase the number of prototype components stored at a determined address but with a lower precision.

9. The neural semiconductor chip of claim 1 further comprising:

masking means for feeding masked data to a neuron.

10. The neural semiconductor chip of claim 9 wherein said masking means comprises:

register means to store the mask data; and,

AND gate means connected between the R/W memory and the improved neuron receiving the mask data on a first input and the data stored in the R/W memory on a second input.

* * * * *